INVENTOR.
Kenneth E. Doriot.
BY
HIS ATTORNEY

INVENTOR.
Kenneth E. Doriot
BY
HIS ATTORNEY

Patented May 6, 1952 2,596,013

UNITED STATES PATENT OFFICE 2,596,013

TRANSMITTING AND RECEIVING CIRCUITS FOR INDUCTIVE CARRIER COMMUNICATION SYSTEMS

Kenneth E. Doriot, Swissvale, Pa., assignor to Westinghouse Air Brake Company, a corporation of Pennsylvania Application January 17, 1950, Serial No. 139,093

2 Claims. (Cl. 179—82)

Figure 1:
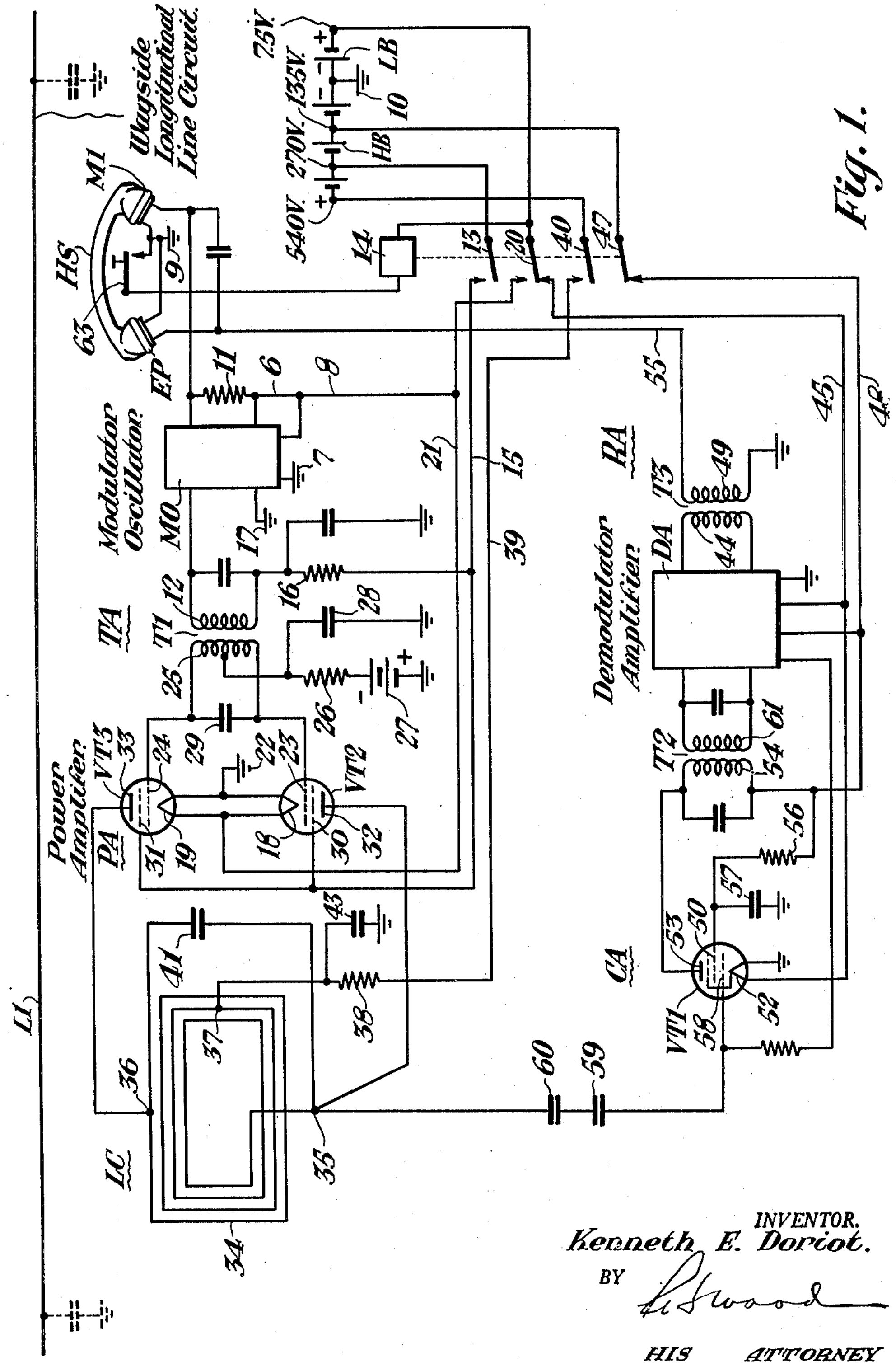

My invention relates to transmitting and receiving circuits for inductive carrier communication systems, and more particularly to transmitting and receiving circuits for an inductive carrier communication system which provides two-way transmission by simplex operation.

Communication systems of the inductive carrier type for mobile units such as, for example, railway trains, are in common use. In these systems transmission along the trackway is effected through a transmitting medium which includes the longitudinal circuit of line wires and other conductors paralleling the trackway and the distributed impedance of the line wires and other conductors to ground. Energy is conveyed between two remotely spaced equipments of a communication system by transmitting and receiving circuits of the different equipments being mounted for inductive relationship to the longitudinal line circuit. That is, in the transmission of communication current between two remotely spaced equipments energy is transferred through the space between the conductors of the line circuit and the equipments due to transmitting and receiving circuits of the equipments being positioned for inductive relationship with the line circuit conductors.

It has been proposed to provide independent transmitting and receiving circuits for each communication equipment, a transmitting circuit being connected to the transmitter of the equipment and a receiving circuit being connected to the receiver. Simplex operation is then effected by selectively energizing the transmitter and the receiver through a push-to-talk device. It has also been proposed to provide a single circuit and electrically switch the circuit to the transmitter or to the receiver through a controller operated by the push-to-talk device. In either case it has been the practice, so far as I am aware, to have the circuit when used for sending coupled to the power amplifier of the transmitter through a transformer. This arrangement heretofore in use results in a loss of power at the transformer due to the relatively high energy level of the power supplied by the transmitter. Also, the initial cost of the equipment must include the cost of the output transformer and its housing and such a transformer and housing may be relatively large compared with the other elements of the equipment. Not infrequently portable equipments are provided for these inductive carrier communication systems for use on a vehicle or along the wayside. In such portable equipment the loss of power at the output transformer, the additional weight of the equipment due to the output transformer and the additional space required in the housing are serious disadvantages.

Transmitting and receiving circuits of an inductive carrier communication system are frequently referred to as a loop circuit and the term "loop circuit" will be used at many points in the present application to identify a circuit having elements that are disposed for inductive relation with a wayside line circuit. Such a loop circuit is frequently made up of an air core coil of one or more turns of a conductor and this coil is positioned for inherent inductive relationship with the line circuit. According to present practice the air core coil of a loop circuit is connected to one winding of an output transformer, the second winding of which transformer is included in the anode or plate circuit of the power amplifier tube of the transmitter. Usually the air core coil is connected to the transformer winding in series with a capacitor to series tune the circuit to resonance at the carrier frequency used in the communication system, and the second winding is parallel tuned to resonance at the carrier frequency.

In view of the foregoing conditions in communication systems of the inductive carrier type, a feature of my invention is the provision of an improved and novel transmitting and receiving circuit for an inductive carrier communication system equipment.

Another feature of my invention is the provision in an inductive carrier communication equipment of an improved transmitting and receiving circuit which is capable of functioning as the anode circuit for the power amplifier of the transmitter of the equipment and also as a high impedance parallel tuned receiving coil for the receiver of the equipment.

Again, a feature of my invention is the provision of inductive carrier communication equipment incorporating an improved loop circuit which is capable of being positioned for direct inductive relationship with a transmitting line circuit and also capable of being used as the anode circuit of a power amplifier tube of the transmitter and in this way minimize the loss of power and increase the efficiency of the equipment during sending periods and wherewith the parts required are reduced and the initial cost correspondingly decreased.

A further feature of my invention is the provision of a loop circuit for communication equipment of the type here involved that is permanently connected to the transmitter and to the receiver and mechanical and electrical switching devices are avoided.

Again, a feature of my invention is the provision of a loop circuit for a communication equipment of the type here involved and which loop circuit can be used either by being positioned for direct inductive relation to a transmitting line circuit or it can be used by being indirectly coupled to the line circuit through a circuit having direct connection to the line circuit.

Other features, objects and advantages of my invention will appear as the specification progresses.

The foregoing features, objects and advantages of my invention I attain by the provision of a transmitting and receiving circuit which includes a coil that preferably is constructed to have an air core of relatively large central area. The construction of this coil is such that the coil can readily be disposed for direct inductive relation with a line wire. For example, when the circuit is used with equipment mounted on a vehicle such as a car of a railway train, the coil may be made of a single turn that approximately surrounds the car in a vertical plane so that this coil inherently has induction with line wires and other conductors paralleling the railway track, the longitudinal circuit formed by these line wires and other conductors, their distributed impedance to ground and the ground path being a wayside transmitting medium for conveying the communication current along the railway. When a transmitting and receiving circuit of my invention is used with a portable equipment, the coil is preferably constructed of several turns of a conductor with an air core of a size that will give satisfactory results and the coil can still be mounted in the housing of the equipment, the portable housing being such that it can be held in a position for the coil to be in a plane parallel with the line wires for inductive relation thereto. Preferably capacitors are connected across the coil and the parts are proportioned for the circuit formed by the coil and capacitors to be tuned for parallel resonance at the frequency of the carrier used by the communication system. The parallel tuned circuit and a suitable source of direct current are connected across the anode and cathode of the electron tube of the power amplifier of the transmitter of the equipment to form the anode or output circuit of the amplifier. This air core coil and the associated tuning capacitor constitute the usual so-called "tank circuit" for the power amplifier tube. Thus when the transmitter of the equipment is energized, the communication current is supplied directly to the loop circuit and the energy is inductively transferred from the coil of this circuit to a wayside line circuit.

The tuned coil of the transmitting and receiving circuit or at least a selected portion of this coil is connected in series with other capacitors across a control electrode or grid of a first stage of the receiver of the equipment so that when the receiver is energized and made active communication energy inductively picked up by the coil from a longitudinal line circuit is applied to the first stage of the receiver and the receiver is influenced thereby. Preferably, the connection of the transmitting and receiving circuit to the power amplifier of the transmitter and to the first stage tube of the receiver of the equipment are permanent connections without switching devices and two-way communication on the same carrier frequency is effected by deenergizing the receiver during sending periods and deenergizing the transmitter during receiving periods.

I shall describe two forms of transmitting and receiving circuits embodying my invention and shall then point out the novel features thereof in claims.

Figure 2:
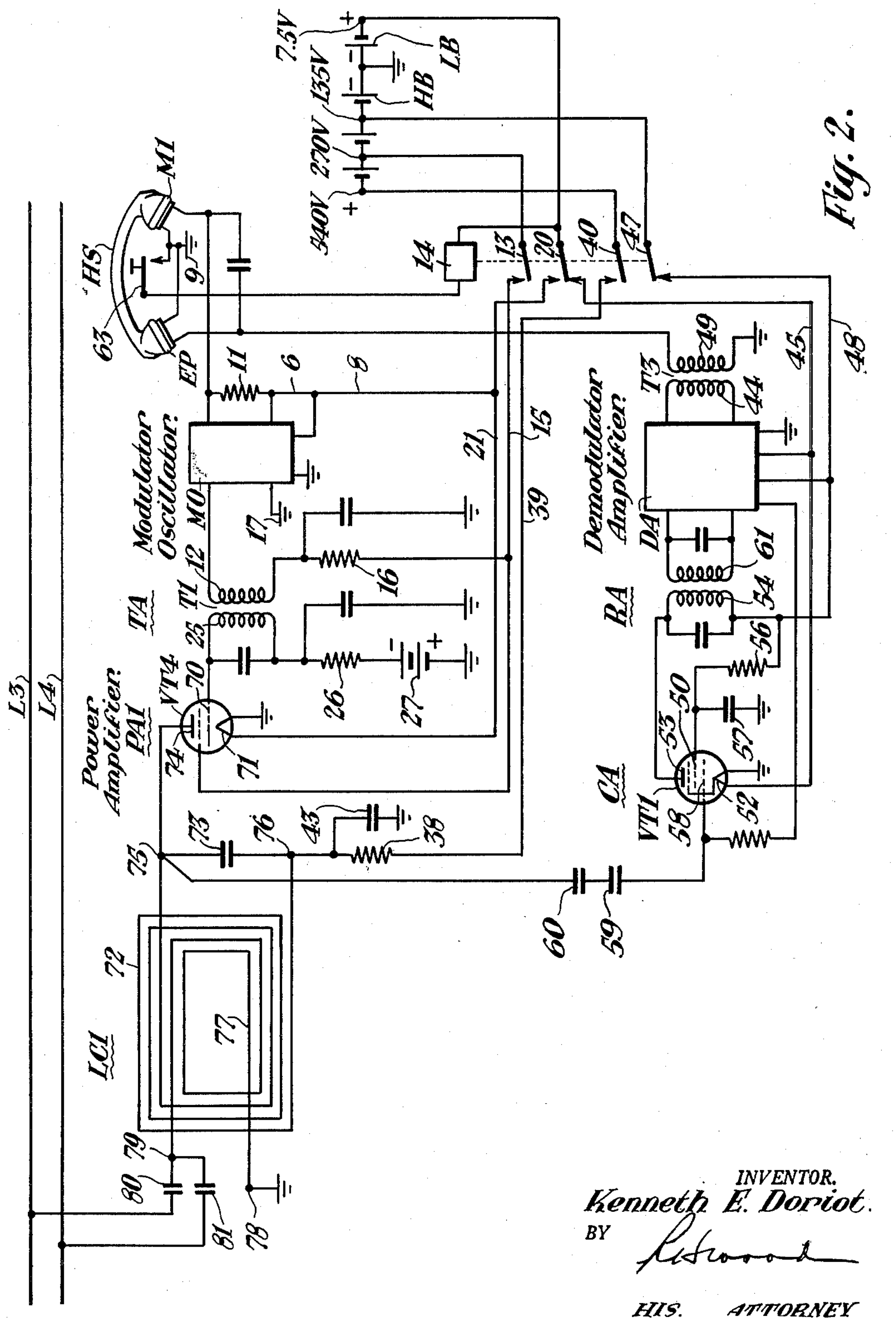

In the accompanying drawings, Fig. 1 is a diagrammatic view showing one form of a transmitting and receiving circuit embodying my invention when used with a portable equipment of a frequency modulated inductive carrier train communication system. Fig. 2 is a diagrammatic view showing another form of transmitting and receiving circuit embodying the invention when used with a wayside or portable equipment of a railway train communication system and wherewith provision is made so that the transmitting and receiving circuit may be indirectly coupled to the longitudinal line circuit.

In each of the two views like reference characters are used to designate similar parts.

It will be understood that my invention is not limited to a railway train communication system nor to a communication system using frequency modulation. The embodiments here disclosed are by way of illustration and there are many other communication systems where my invention would be useful.

Referring to Fig. 1, a transmitter of a communication system is identified as a whole by the reference character TA and a receiver of the equipment is identified as a whole by the reference character RA. The transmitter TA comprises a source of signaling or modulating current, a modulator-oscillator MO and a power amplifier PA, together with proper sources of power and coupling elements. The receiver RA comprises a first stage or carrier amplifier CA, a demodulator-amplifier DA, and a signal responsive device together with suitable sources of power and coupling elements.

Preferably the same sources of power are used to energize both the transmitter TA and the receiver RA. As here shown the power sources comprise a high voltage battery HB and a low voltage battery LB. Both batteries have their negative terminals connected to a ground electrode 10 as is customary in systems of the type here involved. The battery HB is provided with different terminals so as to supply different voltages, the arrangement being such that voltages of 135, 270, and 540 volts are provided at the terminals 135V, 270V, and 540V, respectively. The battery LB is preferably of relatively low voltage, such as 7.5 volts, its positive terminal being identified by the reference character 7.5V.

Referring to the transmitter TA, the modulator-oscillator MO may be any one of several known forms of apparatus for frequency modulation and the device is shown in block form for the sake of simplicity since its specific structure forms no part of my invention. It is sufficient for the present application to point out that a signaling voltage such as a voice frequency voltage created across an input resistor 11 is applied to an oscillator in such a manner as to frequency modulate the carrier generated by the oscillator and a frequency modulated communication current appears in the output of the modulator-oscillator and which output includes a tuned primary winding 12 of a coupling transformer T1. For example, a carrier of say, 144 kilocycles may be frequency modulated by voice frequency current of the range of 300 to 3000 cycles per second. It will be understood, however, that my invention is not limited to any particular carrier frequency and to any particular form of modulating frequency current.

This modulator-oscillator MO is powered from the batteries HB and LB, a low voltage circuit for heater elements of the tubes of the device extending from terminal 7.5V of battery LB through front contact 20 of a relay 14 to be referred to later, wire 8 and ground electrodes 7 and 10 back to the battery LB. A high voltage anode or output circuit for the device can be traced from terminal 270V of battery HB through front contact 13 of relay 14, wire 15, resistor 16, winding 12 of transformer T1, the output terminals of the device MO and ground electrodes 17 and 10 to the negative terminal of battery HB.

As here shown the signaling or modulating voltages created across the input resistor 11 of the device MO are voice frequency voltages created by speaking into the microphone M1 of a hand set HS, a microphone circuit extending from terminal 7.5V of battery LB through front contact 20 of relay 14, wires 8 and 6, resistor 11, microphone M1 of the hand set HS and ground electrodes 9 and 10. It is to be pointed out that the microphone M1 may be replaced by some automatic device which will produce a tone frequency such as, for example, 1000 cycles per second.

The power amplifier PA of the transmitter TA may take any one of several different known arrangements of power amplifier electron tubes. It may comprise a single tube, two or more tubes connected in parallel, or tubes having a push-pull connection. The output energy level required and the type of tube to be used will determine to a certain extent the tube arrangement for the power amplifier and my invention contemplates the use of any suitable known arrangement of power amplifier tubes. As shown in Fig. 1, the power amplifier PA comprises two tubes VT2 and VT3 having a push-pull connection. The tubes VT2 and VT3 are shown as directly heated tetrodes but other types of tubes can be used. The cathodes or filaments 18 and 19 of the tubes VT2 and VT3, respectively, are heated from the battery LB, a heater circuit extending from terminal 7.5V of battery LB through front contact 20 of relay 14, wires 8 and 21, the filaments 18 and 19 in multiple and ground electrodes 22 and 10 back to the battery.

The control grids 23 and 24 of the tubes VT2 and VT3, respectively, are connected to a winding 25 of the coupling transformer T1 in a push-pull arrangement. Specifically, the control grids 23 and 24 are connected to the lower and upper outside terminals, respectively, of winding 25 and a mid terminal of the winding is connected to ground through a resistor 26 and a biasing battery 27, the battery 27 being poled to render the control grids 23 and 24 negative in potential with respect to the grounded side of the associated cathode in order to provide a desirable operating characteristic for the tubes. The resistor 26 and battery 27 are by-passed by a capacitor 28 and the winding 25 is preferably tuned to resonance at the carrier frequency by a capacitor 29. The screen grids 30 and 31 of the tubes VT2 and VT3, respectively, are provided with a positive potential by being connected in multiple to wire 15, which wire in turn is connected to terminal 270V of the battery HB as explained hereinbefore.

The anodes 32 and 33 of tubes VT2 and VT3, respectively, are connected in a push-pull arrangement to a loop circuit to be shortly described and which loop circuit embodies my invention. This loop circuit is identified by the reference character LC and it comprises a tuned air core coil 34 made up of several turns of a conductor and tuning capacitor 41. The area of the coil 34 and the number of turns are preselected to provide an efficient result in both sending and receiving of the communication current here involved. One outside terminal 35 of the coil 34 is connected to anode 32 of the tube VT2 and the other outside terminal 36 of the coil 34 is connected to the anode 33 of the tube VT3 and a mid terminal 37 of the coil is connected to the terminal 540V of the high voltage battery HB through a circuit including resistance 38, wire 39, and front contact 40 of relay 14. Preferably, the resistor 38 is provided with a by-pass capacitor 43. Capacitor 43 is also used to render the mid terminal 37 of coil 34 at zero potential with respect to ground with regard to the transmitted and received carrier currents. The capacitor 41 is connected across the outside terminals 35 and 36 of the coil 34 and the coil and the capacitor are so proportioned that the loop circuit LC is parallel tuned to resonance at the carrier frequency of the communication current. Thus this loop circuit and the associated high voltage battery constitute the anode-cathode circuit for the tubes of the power amplifier.

It follows that when the relay 14 is picked up to close front contacts 13, 20, and 40 so that power is applied to the different parts of the transmitter TA, an operator speaking into the microphone M1 will cause voice frequency voltages to appear across resistor 11 and a corresponding frequency modulated carrier current will be applied to the power amplifier through the coupling transformer T1. This communication current will in turn be supplied to the loop circuit at a relatively high energy level due to the amplification at the power amplifier. The current in the loop circuit LC is in turn available to induce a corresponding electromotive force in a wayside circuit for transmission to a remote equipment of the system.

In Fig. 1 such a wayside transmitting line circuit is disclosed as comprising a line wire L1, its distributed impedance to ground and the ground path, the distributed impedance to ground being visualized in the drawing by capacitors and ground electrodes shown in dotted lines. It is understood, however, that the capacitors and ground electrodes shown in dotted lines are not physical elements. Furthermore, it is to be pointed out that this wayside line circuit would ordinarily include any other line wire and conductor extending parallel to the line wire L1 due to the induction of coil 34 to these other line wires and due to the distributed impedance between such line wires.

The coil 34 of the loop circuit is mounted in any suitable manner by which the coil can be brought into a position such that it will inherently have inductive relationship with the line wire L1. In other words, the coil 34 is constructed in such a manner that it is capable of being placed in a position for inductive coupling directly to the line circuit L1. When used with portable equipment as contemplated in Fig. 1, the coil 34 would be mounted in a housing of the equipment in such a manner that the housing can be held in a position to place the coil in inductive relationship with the line circuit. When the loop circuit is used with a vehicle carried equipment then the coil will be placed in a position on the vehicle in a vertical plane for the coil to have direct inductive relationship with the line circuit. Consequently the modulated carrier current created in the transmitter TA and amplified at the power amplifier PA will be supplied directly to the loop circuit LC due to the loop circuit being included in the anode-cathode circuit of the power amplifier tubes and the modulated carrier current thus supplied to the loop circuit will create a corresponding electromotive force in the line circuit due to the direct inductive relationship of the loop circuit coil 34 with the line wires of the line circuit.

Referring to the receiver RA, the first stage carrier amplifier CA includes an electron tube VT1, which is here shown as a directly heated pentode but other types of tubes can be used. The filament 52 of the tube is heated by current from the battery LB supplied through a circuit which includes terminal 7.5V, back contact 20 of relay 14, wire 45 and ground. The anode 53 of the tube is powered from battery HB through a circuit extending from terminal 135V through back contact 47 of relay 14, wire 48, a winding 54 of a coupling transformer T2, anode 53 and tube space to cathode 52 and ground back to the battery. Also power is supplied to a screen grid 50 of the tube VT1 from terminal 135V through a resistor 56 which is connected to wire 58 and which is provided with a by-pass capacitor 57. This first stage tube VT1 is provided with an input circuit that includes the loop circuit LC. Specifically, a control grid 58 of the tube VT1 is connected to the terminal 35 of the coil 34 through two capacitors 59 and 60 in series. A cathode connection of the input circuit of tube VT1 is completed through the ground connection of the by-pass capacitor 43. While two capacitors 59 and 60 in series are preferably used in the connection to terminal 35 due to the relatively high direct voltage applied to the terminal when the coil is used for sending only one of these capacitors may be required.

The demodulator-amplifier DA may be any one of several arrangements known for demodulating a frequency modulated carrier current and it is shown in block form in order to simplify the drawing since its specific structure forms no part of my invention.

It is sufficient for the present application to point out that when a frequency modulated carrier current is supplied to the winding 61 of the coupling transformer T2, a corresponding modulating frequency current is created in the winding 44 of the transformer T3 and in the case here involved a voice frequency current is created in the winding 44. The winding 44 is in turn coupled to the earphone EP of the hand set HS by an obvious circuit which includes winding 49 wire 55 and ground.

The demodulator-amplifier DA is powered from the batteries HB and LB, the terminal 7.5V being connected to the device through back contact 20 of relay 14 and wire 45 to provide a heating current for the electron tubes of the device, and energy being supplied from terminal 135V through back contact 47 of relay 14 and wire 48 to the device to provide an anode voltage for the tubes used in the demodulator-amplifier.

It should be here pointed out that as shown in Fig. 1 only a half portion of the coil 34 between the outside terminal 35 and the mid terminal 37 is included in the input or control grid-cathode circuit for the tube VT1.

Thus when the relay 14 is deenergized to close its back contacts 20 and 47, the receiver RA is energized and made active to amplify and demodulate a frequency modulated carrier current created in the coil 34 of the loop circuit due to the coil 34 being included in the control grid-cathode circuit of the first stage tube VT1. That is to say, when a frequency modulated carrier current is supplied to the line wire L1 at some remote point, an electromotive force is induced directly in the coil 34 of the loop circuit and this electromotive force is applied to the first stage amplifier of the receiver and the modulating frequency current which is here a voice frequency current is reproduced at the earphone EP of the hand set.

The relay 14 serves as a push-to-talk device, the relay 14 being energized by current supplied from battery LB through an obvious circuit which includes battery LB, the winding of the relay, and a push button 63 mounted in the hand set HS.

It is apparent from the foregoing description that normally, that is, during stand-by or non-communication periods, the push-to-talk relay 14 is released to close back contacts 20 and 47 and the receiver RA is energized and the transmitter TA is deenergized. Thus, normally, any communication current picked up by the coil 34 is amplified and demodulated and the resultant audio frequency current is reproduced in the earphone EP. In the event an operator of the equipment of Fig. 1 wishes to send a message, he will pick up the hand set to bring it closer to him and then close the push button 63 to energize the relay 14. With relay 14 picked up the receiver RA is deenergized due to the opening of back contacts 20 and 47 and the transmitter TA is energized due to the closing of front contacts 13, 20, and 40 of relay 14. With the transmitter TA energized and the operator speaks into the microphone M1 so as to create a modulating voltage across the resistor 11, a corresponding frequency modulated current is supplied to the loop circuit LC and a corresponding electromotive force is induced in the associated wayside line circuit L1 for transmission to a remote equipment due to the inductive relationship of the coil 34 of the loop circuit with the line circuit. Obviously, a two-way communication can be carried on between the equipment of Fig. 1 and a remote similar equipment by each operator using his push button 63 to selectively energize his transmitter and receiver.

The equipment of Fig. 2 is similar to that of Fig. 1 except for the power amplifier PA1 of the transmitter TA and the construction of the loop circuit LC1. Also, in Fig. 2 the line circuit is shown as including two line wires L3 and L4 in multiple and the ground return path.

The power amplifier PA1 includes a single amplifier tube VT4 which is shown as a directly heated tetrode. The full winding 25 of the coupling transformer T1 of the transmitter in series with resistor 26 and bias battery 27 are connected across the control grid 70 and cathode 71 of the tube VT4 to provide an input circuit for the tube.

The loop circuit LC1 includes an air core coil 72 and a tuning capacitor 73 connected across the terminals 75 and 76 of the coil 72. The coil 72 and the capacitor 73 are proportioned to parallel tune the loop circuit to resonance at the carrier frequency used. The loop circuit is included in the anode circuit of the tube VT4, the circuit being powered from terminal 540V of battery HB and completed through front contact 40 of relay 14, wire 39, resistor 38, loop circuit LC1 and the tube space between anode 74 and cathode 71 of the tube VT4. That is, the loop circuit including coil 72 and capacitor 73, is included directly in the anode-cathode circuit of the amplifier tube VT4.

The receiver RA of Fig. 2 is the same as in Fig.

1 and the description need not be repeated except to point out that the control grid 58 and cathode 52 of the first stage amplifier tube VT1 are connected across terminals 75 and 76 of the coil 72 of the loop circuit through capacitor 43.

The coil 72 of the loop circuit LC1 would preferably be constructed similar to the coil 34 of the loop circuit LC of Fig. 1 so that the coil 72 is capable of being positioned for direct inductive relation with the line circuit which here includes the line wires L3 and L4 in multiple.

In Fig. 2, a second coil 77 is constructed within the coil 72 of the loop circuit, the two coils 72 and 77 forming an air core transformer. One terminal 78 of the coil 77 is connected to ground and the other terminal 79 of the coil is connected to the two line wires L3 and L4 through capacitors 80 and 81, respectively. When the equipment of Fig. 2 is used at a wayside station, it is sometimes desirable to connect the equipment directly across the line circuit in order to be able to apply a higher energy level to the line circuit during sending periods and in order to be responsive to a lower level of energy flowing in the line circuit during the receiving periods. At such points, the coil 77 would be connected as shown in Fig. 2 and communication current supplied to the coil 72 of the loop circuit will induce an electromotive force in the winding 77 and this electromotive force is applied directly to the line circuit. Conversely, communication current flowing in the line circuit will be supplied to winding 77 and an electromotive force induced in the coil 72 and this electromotive force applied directly to the first stage amplifier tube VT1 of the receiver.

When it is not feasible to make a direct connection to the line circuit from the coil 77 the coil would be left open circuited and energy would be transferred between coil 72 and the loop circuit and the line circuit by the positioning of the coil 72 for direct inductive relation to the line circuit.

I have found that an air core coil 77 can be readily wound on the same frame used to mount the coil 72 of the loop circuit and the coil 77 with the capacitors 80 and 81 add little to the weight and size of the equipment and it may prove useful at points where the equipment can be readily connected to the line circuit.

Although I have herein shown and described only two forms of transmitting and receiving circuits for inductive carrier communication systems embodying my invention, it is understood that various changes and modifications may be made therein within the scope of the appended claims without departing from the spirit and scope of my invention.

Having thus described my invention, what I claim is:

1. In communication equipment, the combination comprising, a transmitter including a modulator oscillator and an output power amplifier, said modulator oscillator including means operable to supply a given carrier modulated by a given signal frequency, said output amplifier including an electron tube having an anode, a cathode and a control electrode and provided with means to couple its control electrode and cathode to said modulator oscillator; a receiver including a demodulator amplifier and an input carrier amplifier, said demodulator amplifier including means operable to demodulate said given carrier modulated by said given signal frequency; said input amplifier including an electron tube having an anode, a cathode and a control electrode and provided with means to couple its anode and cathode to said demodulator amplifier; a loop circuit including a relatively large air core coil and a capacitor and tuned to resonance at the frequency of said carrier, a transmitting medium including a conductor adapted to transmit modulated carrier current and disposed for inductive relationship with said coil, a resistor provided with a by-pass capacitor which is effective to pass said given carrier, another capacitor, a power source, a sending circuit including said loop circuit, said resistor and said power source in series connected at times across said anode and cathode of said power amplifier tube to inductively supply said modulated carrier directly from the anode-cathode circuit of the power amplifier to the transmitting medium, and a receiving circuit including said loop circuit, said another capacitor and said by-pass capacitor in series permanently connected across said control electrode and cathode of said carrier amplifier tube to enable said receiver to inductively receive modulated carrier flowing in said transmitting medium when the receiver is activated.

2. In communication equipment, the combination comprising, a transmitter including a modulator oscillator and an output power amplifier, said modulator oscillator including means operable to supply a given carrier modulated by a given signal frequency, said power amplifier including a pair of electron tubes each having an anode, a cathode and a control grid; said power amplifier having means to couple said modulator oscillator to the control grids and cathodes of its tubes in push pull, a loop circuit including an air core coil and a capacitor connected across the coil, said loop circuit being tuned to resonance at the frequency of said carrier, said coil having its outside terminals connected across the anodes of said tubes and a mid terminal connected to one terminal of a power source the other terminal of which source is connected to the cathodes of said tubes in multiple, a receiver including a demodulator amplifier and a carrier amplifier, said demodulator amplifier including means to demodulate said carrier modulated by said signal frequency; said carrier amplifier including an electron tube having an anode, a cathode and a control grid and provided with means to couple its anode and cathode to said demodulator amplifier; another capacitor, and means including said another capacitor to permanently connect the control grid and cathode of said carrier amplifier tube across the mid terminal and a selected one of the outside terminals of said air core coil.

KENNETH E. DORIOT.

REFERENCES CITED

The following references are of record in the file of this patent:

UNITED STATES PATENTS

| Number | Name | Date |
|---|---|---|
| 1,479,638 | Zworykin | Jan. 1, 1924 |
| 2,185,336 | Gerardi | Jan. 2, 1940 |
| 2,312,824 | Kroger | Mar. 2, 1943 |